United States Patent
Hu et al.

(10) Patent No.: US 12,531,716 B2
(45) Date of Patent: Jan. 20, 2026

(54) PARAMETER CONFIGURATION METHOD, DEVICE, AND SYSTEM

(71) Applicant: Huawei Technologies Co., Ltd., Shenzhen (CN)

(72) Inventors: Tongfu Hu, Beijing (CN); Tao He, Dongguan (CN); Jingfei Lv, Wuhan (CN); Hao Li, Dongguan (CN); Jinhui Wang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 619 days.

(21) Appl. No.: 17/965,117

(22) Filed: Oct. 13, 2022

(65) Prior Publication Data

US 2023/0034757 A1 Feb. 2, 2023

Related U.S. Application Data

(63) Continuation of application No. PCT/CN2021/086653, filed on Apr. 12, 2021.

(30) Foreign Application Priority Data

Apr. 14, 2020 (CN) .......................... 202010292417.5

(51) Int. Cl.
*H04L 7/00* (2006.01)
*H04J 3/06* (2006.01)

(52) U.S. Cl.
CPC .......... *H04L 7/0008* (2013.01); *H04J 3/0667* (2013.01)

(58) Field of Classification Search
CPC ....... H04J 3/0667; H04J 3/14; H04L 41/0806; H04L 7/0008
See application file for complete search history.

(56) References Cited

U.S. PATENT DOCUMENTS

| | | | |
|---|---|---|---|
| 6,085,104 A | 7/2000 | Kowalski et al. | |
| 8,718,482 B1* | 5/2014 | Roberts | H04B 10/27 398/53 |
| 9,270,621 B1* | 2/2016 | Muehlebach | H04L 51/212 |
| 9,407,733 B1* | 8/2016 | Mizrahi | H04J 3/0697 |
| 9,998,247 B1* | 6/2018 | Choudhury | H04J 3/0667 |

(Continued)

FOREIGN PATENT DOCUMENTS

| | | |
|---|---|---|
| CN | 1668084 A | 9/2005 |
| CN | 100364318 C | 1/2008 |

(Continued)

*Primary Examiner* — Dung B Huynh
(74) *Attorney, Agent, or Firm* — Slater Matsil, LLP

(57) ABSTRACT

A method, a device, and a system, the method including determining, by a management device, a first transmission path that is in a network system and that is used to transmit a clock packet of a target clock source, sending, by the management device, configuration information for the first transmission path to a plurality of network devices on the first transmission path, receiving, by the management device, information that is sent by an endpoint network device on the first transmission path and that is used to determine a time difference, and sending, by the management device, a corresponding clock compensation value to at least one network device on the first transmission path based on the information that is used to determine the time difference.

20 Claims, 8 Drawing Sheets

(56) References Cited

U.S. PATENT DOCUMENTS

| | | | | |
|---|---|---|---|---|
| 10,355,800 | B2* | 7/2019 | Ruffini | H04J 3/06 |
| 10,986,426 | B1* | 4/2021 | Loprieno | H04B 10/0771 |
| 11,520,372 | B1* | 12/2022 | Wang | G06F 1/12 |
| 11,848,860 | B2* | 12/2023 | Mullis | H04L 45/28 |
| 2004/0243870 | A1* | 12/2004 | Henkel | G06F 1/10 |
| | | | | 713/400 |
| 2010/0135189 | A1 | 6/2010 | Shi et al. | |
| 2012/0250704 | A1* | 10/2012 | Yamada | H04J 3/0661 |
| | | | | 370/503 |
| 2012/0311653 | A1* | 12/2012 | Xu | H04J 3/0638 |
| | | | | 725/116 |
| 2013/0208735 | A1* | 8/2013 | Mizrahi | H04J 3/0664 |
| | | | | 370/503 |
| 2013/0259049 | A1* | 10/2013 | Mizrahi | H04J 3/0664 |
| | | | | 370/392 |
| 2013/0326088 | A1* | 12/2013 | Uchida | H04L 41/50 |
| | | | | 709/248 |
| 2014/0226984 | A1* | 8/2014 | Roberts | H04Q 11/0001 |
| | | | | 398/66 |
| 2015/0003479 | A1* | 1/2015 | Shenoi | H04J 3/0661 |
| | | | | 370/503 |
| 2015/0229388 | A1* | 8/2015 | Xu | H04L 7/0075 |
| | | | | 398/29 |
| 2015/0236807 | A1* | 8/2015 | Mizrahi | H04J 3/0641 |
| | | | | 370/503 |
| 2016/0006804 | A1* | 1/2016 | Deshpande | H04L 41/0213 |
| | | | | 709/248 |
| 2016/0080100 | A1* | 3/2016 | Yan | H04J 3/0688 |
| | | | | 370/216 |
| 2016/0087837 | A1 | 3/2016 | Wagener et al. | |
| 2016/0149658 | A1* | 5/2016 | Xia | H04L 41/06 |
| | | | | 370/217 |
| 2016/0165276 | A1* | 6/2016 | Toma | H04N 21/6125 |
| | | | | 725/116 |
| 2016/0173216 | A1* | 6/2016 | Yang | H04L 45/24 |
| | | | | 370/350 |
| 2016/0337114 | A1* | 11/2016 | Baden | H04J 3/0697 |
| 2017/0150464 | A1* | 5/2017 | Kazehaya | H04L 12/422 |
| 2017/0288802 | A1* | 10/2017 | Qiao | H04L 7/00 |
| 2017/0346714 | A1* | 11/2017 | Mizrahi | H04L 43/0858 |
| 2018/0013508 | A1* | 1/2018 | Rabinovich | H04J 3/0667 |
| 2018/0131459 | A1 | 5/2018 | Zhang et al. | |
| 2018/0287725 | A1* | 10/2018 | Rabinovich | H04J 3/0673 |
| 2019/0140758 | A1* | 5/2019 | Cotter | H04L 43/0811 |
| 2019/0260490 | A1* | 8/2019 | Lv | H04J 3/067 |
| 2020/0304224 | A1* | 9/2020 | Neugeboren | H04L 43/0858 |
| 2020/0344333 | A1* | 10/2020 | Hawari | H04J 3/0667 |
| 2020/0403901 | A1* | 12/2020 | Sugiyama | H04L 45/123 |
| 2021/0153151 | A1* | 5/2021 | Yin | H04W 56/005 |
| 2021/0273736 | A1* | 9/2021 | Li | H04W 76/12 |
| 2022/0060310 | A1* | 2/2022 | Arai | H04L 45/3065 |
| 2022/0182214 | A1* | 6/2022 | Ogawa | H04L 7/0016 |
| 2022/0294549 | A1* | 9/2022 | Nakagawa | H04J 3/0682 |
| 2023/0025680 | A1* | 1/2023 | Yamashita | H04J 3/14 |

FOREIGN PATENT DOCUMENTS

| | | |
|---|---|---|
| CN | 102439884 B | 3/2013 |
| CN | 103166729 A | 6/2013 |
| CN | 104349449 A | 2/2015 |
| CN | 105491433 A | 4/2016 |
| CN | 109218007 A | 1/2019 |
| CN | 109918820 A | 6/2019 |
| CN | 209606534 U | 11/2019 |
| CN | 106464656 B | 2/2020 |
| CN | 110677210 B | 6/2021 |
| EP | 3270531 A1 | 1/2018 |
| JP | 2019523425 A | 8/2019 |
| WO | 2006086914 A1 | 8/2006 |
| WO | 2011060965 A1 | 5/2011 |

* cited by examiner

PARAMETER CONFIGURATION METHOD, DEVICE, AND SYSTEM

CROSS-REFERENCE TO RELATED APPLICATIONS

This application is a continuation of International Application No. PCT/CN2021/086653, filed on Apr. 12, 2021, which claims priority to Chinese Patent Application No. 202010292417.5, filed on Apr. 14, 2020. The disclosures of the aforementioned applications are hereby incorporated by reference in their entireties.

TECHNICAL FIELD

This application relates to the field of communication technologies, and in particular, to a parameter configuration method, a device, and a system.

BACKGROUND

A network system usually includes a plurality of network devices. A terminal may access the network system by using any network device.

To ensure stability and reliability of the network system, the plurality of network devices may receive a clock packet sent by a clock source, and implement clock synchronization based on the clock packet. In addition, to facilitate transmission of the clock packet sent by the clock source in a plurality of network devices, before the clock source sends the clock packet to the plurality of network devices, parameters of a transmission path that is used to transmit the clock packet need to be configured for the plurality of network devices, so that these network devices can transmit, based on the parameters and the corresponding transmission path, the clock packet sent by the clock source.

Therefore, currently, a method in which a parameter of a transmission path that is used to transmit a clock packet can be automatically configured for a network device is urgently required.

SUMMARY

This application provides a parameter configuration method, a device, and a system, which can automatically configure, for a network device, a parameter of a transmission path that is used to transmit a clock packet. The technical solutions are as follows.

According to a first aspect, a parameter configuration method is provided. The method includes: After determining a first transmission path that is in a network system and that is used to transmit a clock packet of a target clock source, a management device separately sends configuration information for the first transmission path to a plurality of network devices on the first transmission path. Further, the management device may further receive information that is sent by an endpoint network device on the first transmission path and that is used to determine a time difference, and send a corresponding clock compensation value to at least one network device on the first transmission path based on the information.

It may be learned that, in the parameter configuration method provided in embodiments of this application, the management device can automatically configure, for the network device, a parameter of a transmission path that is used to transmit the clock packet, to improve parameter configuration efficiency. In addition, the management device can obtain the information that is sent by the endpoint network device and that is used to determine the time difference, and automatically calculate a network-wide clock compensation value based on the information, to reduce a quantity of onsite measurement of maintenance personnel, and lower skill requirements for management and operation personnel.

Optionally, that a management device determines a first transmission path that is in a network system and that is used to transmit a clock packet of a target clock source includes: The management device determines a plurality of the first transmission paths that are in the network system and that are used to transmit the clock packet of the target clock source. That is, the management device may determine one or more first transmission paths. This is not limited in this application.

Optionally, when separately sending the corresponding configuration information to the network devices on the first transmission path, the management device may send the corresponding configuration information to the network devices on the determined first transmission path in ascending or descending order of a quantity of hops from the network devices to the target clock source. In this way, the management device can send the configuration information to the plurality of network devices on at least one first transmission path in batches according to such a rule. In addition, when there are a relatively large quantity of the determined first transmission paths, missing sending of the configuration information can be avoided according to the rule of sending the configuration information, and efficiency of sending the configuration information by the management device can be improved.

In this application, an example in which the management device sends the corresponding configuration information to the network devices on the determined first transmission path in ascending order of the quantity of hops from the network devices to the target clock source is used. Optionally, the management device may send the corresponding configuration information to the network devices on the determined first transmission path in another order. For example, the management device may send the corresponding configuration information to the network devices on the determined first transmission path in descending order of the quantity of hops from the network devices to the target clock source. For another example, when determining a plurality of first transmission paths, the management device may sequentially send the corresponding configuration information to the network devices on the plurality of first transmission paths.

Optionally, in a process in which the management device determines the first transmission path that is in the network system and that is used to transmit the clock packet of the target clock source, the management device may obtain a clock parameter of each network device in the network system, and determine, based on the clock parameter of the network device in the network system, a network device that supports clock synchronization in the network system. Then, the management device determines the first transmission path based on a connection relationship between the network device that supports clock synchronization and the target clock source. The clock parameter of the network device is used to indicate whether the network device supports clock synchronization. It may be learned that, in this application, the management device can learn of an actual function of the network device based on the clock parameter of the network device, to avoid a case that a network device without clock synchronization is included in a planned first transmission path. Even if the function of the network device changes with time, the management device can still avoid the case that the network device without clock synchronization is included in the planned first transmission path, to ensure validity of the determined first transmission path.

Optionally, that the management device sends a corresponding clock compensation value to at least one network device on the first transmission path based on the received information that is used to determine the time difference includes: The management device determines a relationship between time differences of all first transmission paths and a first group of unknown compensation parameters based on the received information that is used to determine the time difference. The time difference of the first transmission path corresponds to the information that is sent by the endpoint network device on the first transmission path and that is used to determine the time difference. The first group of unknown compensation parameters includes a clock compensation value between every two adjacent network devices on the first transmission path. The management device determines, based on the relationship between the time differences of all the first transmission paths and the first group of unknown compensation parameters, the clock compensation value corresponding to the at least one network device, and sends the corresponding clock compensation value to the at least one network device.

Optionally, the time difference is a difference value between 1588 time of the endpoint network device and time of the target clock source. The 1588 time may be 1588V2 time.

Optionally, the clock compensation value includes an optical fiber asymmetry compensation value.

According to a second aspect, a parameter configuration method is provided. The method includes: An endpoint network device receives configuration information sent by a management device, configures, based on the configuration information, a parameter of a first transmission path that is used to transmit a clock packet of a target clock source, and processes the clock packet based on the parameter of the first transmission path. Then, the endpoint network device sends, to the management device based on the clock packet, information that is used to determine a time difference, receives a clock compensation value sent by the management device, and performs clock compensation based on the clock compensation value.

According to a third aspect, a parameter configuration method is provided. The method includes: An intermediate network device receives configuration information sent by a management device, configures, based on the configuration information, a parameter of a first transmission path that is used to transmit a clock packet of a target clock source, and processes the clock packet based on the parameter of the first transmission path. Then, the intermediate network device receives a clock compensation value sent by the management device, and performs clock compensation based on the clock compensation value.

According to a fourth aspect, a parameter configuration device is provided. The parameter configuration device includes a module configured to perform the parameter configuration method provided in the first aspect.

According to a fifth aspect, a parameter configuration device is provided. The parameter configuration device includes a module configured to perform the parameter configuration method provided in the second aspect.

According to a sixth aspect, a parameter configuration device is provided. The parameter configuration device includes a module configured to perform the parameter configuration method provided in the third aspect.

According to a seventh aspect, a management device is provided. The management device includes a processor, a memory, and a transceiver. The memory stores at least one instruction, and the processor is configured to execute computer-readable instructions in the memory, so that the management device performs the parameter configuration method according to any design in the first aspect.

According to an eighth aspect, a network device is provided. The network device includes a processor, a memory, and a transceiver. The memory stores at least one instruction, and the processor is configured to execute computer-readable instructions in the memory, so that the network device performs the parameter configuration method according to any design in the second aspect.

According to a ninth aspect, a network device is provided. The network device includes a processor, a memory, and a transceiver. The memory stores at least one instruction, and the processor is configured to execute computer-readable instructions in the memory, so that the network device performs the parameter configuration method according to any design in the third aspect.

According to a tenth aspect, a network system is provided. The network system includes a management device and a plurality of network devices.

The management device is the parameter configuration device according to any design in the fourth aspect. The plurality of network devices include the parameter configuration device according to any design in the fifth aspect and the parameter configuration device according to any design in the sixth aspect.

Alternatively, the management device is the parameter configuration device according to any design in the seventh aspect. The plurality of network devices include the parameter configuration device according to any design in the eighth aspect and the parameter configuration device according to any design in the ninth aspect.

According to an eleventh aspect, a computer-readable storage medium is provided. The storage medium stores at least one instruction, and the instruction is loaded by a processor to perform the parameter configuration method according to any design in the first aspect, the second aspect, or the third aspect.

According to a twelfth aspect, a computer program product including instructions is provided. When the computer program product is run on a network device, the network device is enabled to perform the parameter configuration method according to any design in the first aspect, the second aspect, or the third aspect.

For technical effects brought by any one of design manners in the second aspect to the twelfth aspect, refer to technical effects brought by a corresponding design manner in the first aspect. Details are not described herein again.

DETAILED DESCRIPTION OF ILLUSTRATIVE EMBODIMENTS

To make principles and technical solutions of this application clearer, the following further describes implementations of this application in detail with reference to the accompanying drawings.

Figure 1:
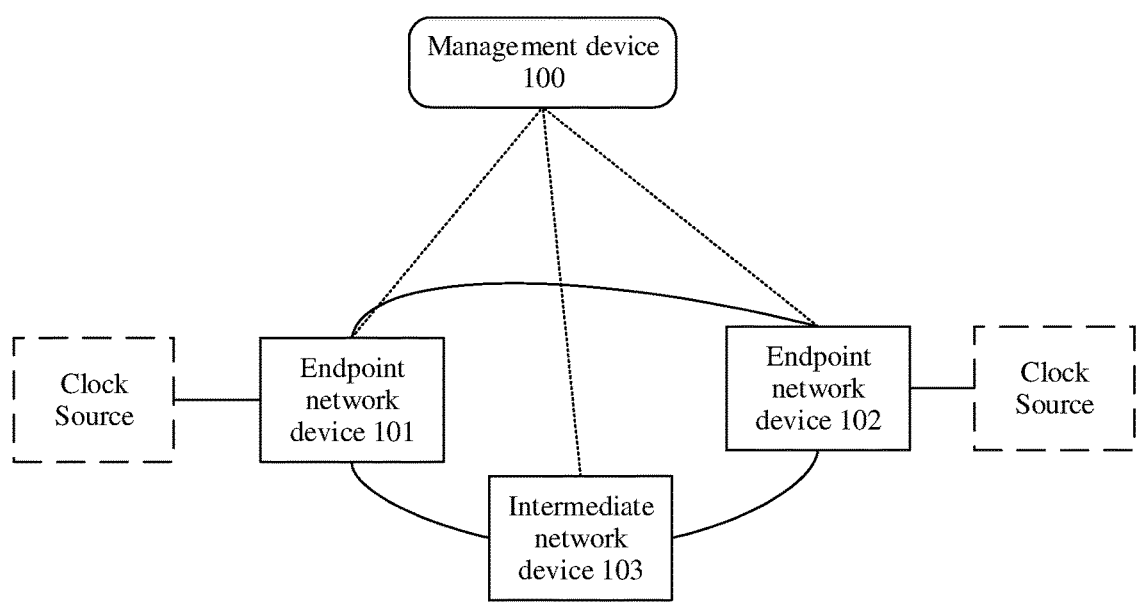
FIG. 1 is a schematic diagram of a structure of a network system according to an embodiment of this application.

FIG. 1 is a schematic diagram of a structure of a network system according to an embodiment of this application. Refer to FIG. 1. A network system including the system may be a low-delay network system, for example, a 5th generation mobile communication technology (5G) network system or another network system with a relatively low delay requirement. The system includes a management device and a plurality of network devices. For example, a management device 100 shown in FIG. 1 manages the plurality of network devices in the figure. The plurality of devices include an endpoint network device and an intermediate network device. The endpoint network device is a network device connected (directly or indirectly connected) to a clock source, for example, an endpoint network device 101 and an endpoint network device 102 shown in FIG. 1. The intermediate network device is a network device that is not connected to the clock source and that synchronizes a clock packet by using the endpoint network device, for example, an intermediate network device 103 shown in FIG. 1.

Optionally, the network system may perform clock synchronization based on 1588V2. The 1588V2 is an IEEE 1588V2 (IEEE Standard for a Precision Clock Synchronization Protocol for Networked Measurement and Control Systems) release standard officially released by an Institute of Electrical and Electronics Engineers (IEEE) in 2008. The standard is a precision clock synchronization protocol standard for a network system measurement and control system, and uses a precision time synchronization (Precision Time Protocol, PTP) protocol mechanism, and precision may reach a sub-microsecond level, which implements frequency synchronization and time (phase) synchronization.

The management device 100 is a device on which a management system is deployed, for example, may be a mobile phone, a personal computer (PC), a tablet (Tablet PC), a notebook computer, an ultra-mobile personal computer, a personal digital assistant, a server, a server cluster, or the like. This is not limited in embodiments of this application. Optionally, the management device may be a network system management device, a network system control system device, a network system controller device, or the like.

The network device may be a network device of a type such as an internet protocol (IP) network device, a wavelength division multiplexing (WDM) network device, or an optical transport network (OTN) network device, for example, a router. This is not limited in embodiments of this application.

Optionally, the clock source may be a global navigation satellite system (GNSS), for example, a global positioning system (GPS) of the United States, a Global Navigation Satellite System (GLONASS) of Russia, a Galileo positioning system (Galileo) of the European Union, a BeiDou Navigation Satellite System of China, or another clock source. This is not limited in this embodiment of this application.

The plurality of network devices in the network system may perform clock synchronization based on a clock packet sent by the clock source, to reduce a delay of the network system. In addition, to facilitate transmission of the clock packet sent by the clock source in the plurality of network devices, parameters of a transmission path that is used to transmit the clock packet need to be configured for the plurality of network devices, so that these network devices can transmit, based on the parameters and the corresponding transmission path, the clock packet sent by the clock source. An embodiment of this application provides a parameter configuration method. The method can automatically configure, for the network device, a parameter of a transmission path that is used to transmit the clock packet, to improve parameter configuration efficiency.

Figure 2:
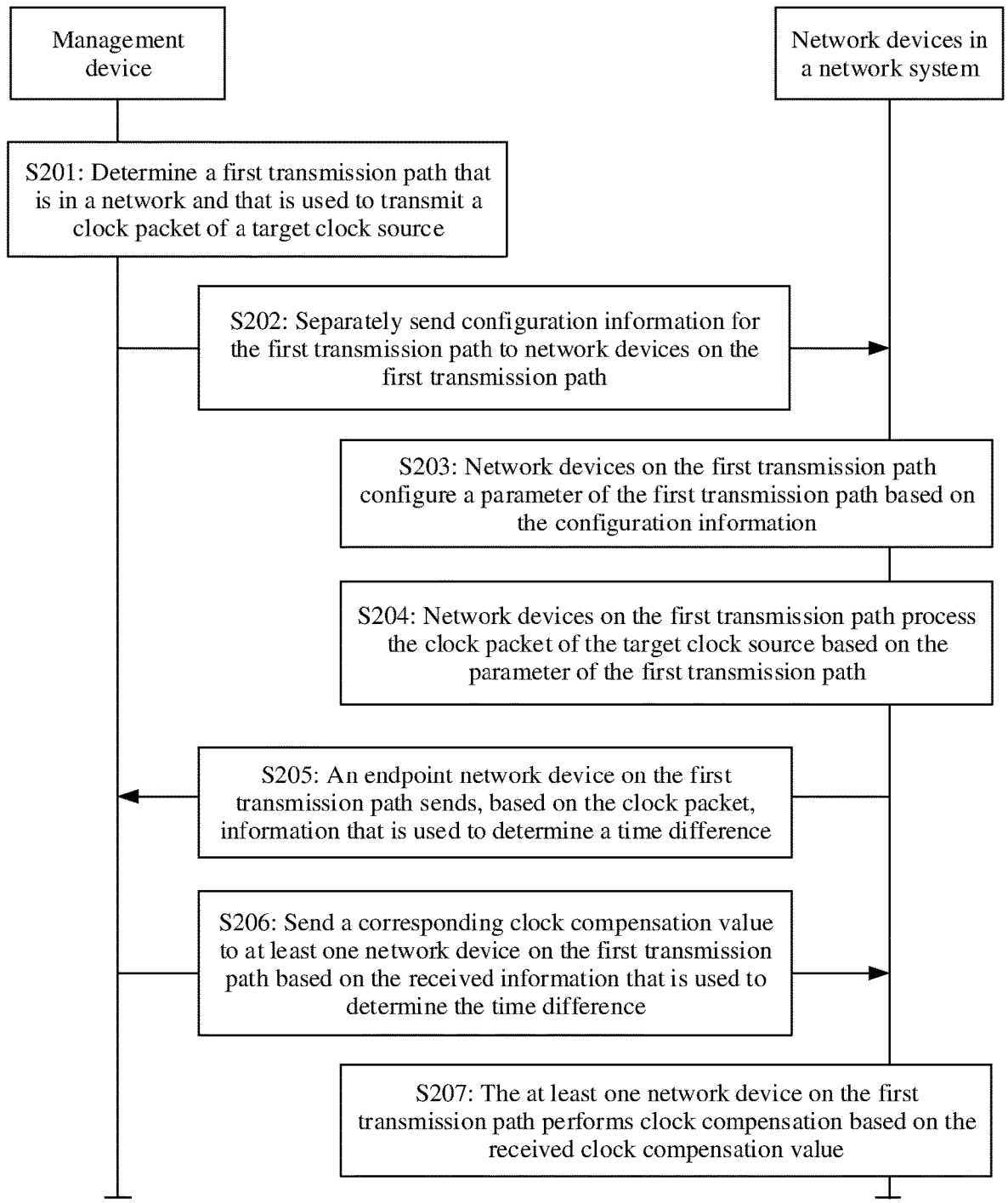
FIG. 2 is a flowchart of a clock compensation method according to an embodiment of this application.

For example, FIG. 2 is a flowchart of a clock compensation method according to an embodiment of this application. Interaction of the method mainly includes a management device and a plurality of network devices. The management device and the plurality of network devices may access each other. As shown in FIG. 2, the method may include:

S201: The management device determines a first transmission path that is in a network system and that is used to transmit a clock packet of a target clock source.

The target clock source may be any clock source connected to one or more network devices in the network system. In S201, the management device may first determine network devices that support clock synchronization and that are in the network system, and then determine, based on connection relationships between the network devices and the target clock source, the first transmission path that is used to transmit the clock packet of the target clock source. For example, in this embodiment of this application, the management device can obtain a clock parameter (where the clock parameter of the network device is used to indicate whether the network device supports clock synchronization) of each network device in the network system. The management device may determine, based on the clock parameter of the network device in the network system, the network device that supports clock synchronization in the network system.

It should be noted that there may be one or more first transmission paths that are in the network system and that are used to transmit the clock packet of the target clock source. In this embodiment of this application, an example in which there are a plurality of first transmission paths in the network system is used.

Figure 3:
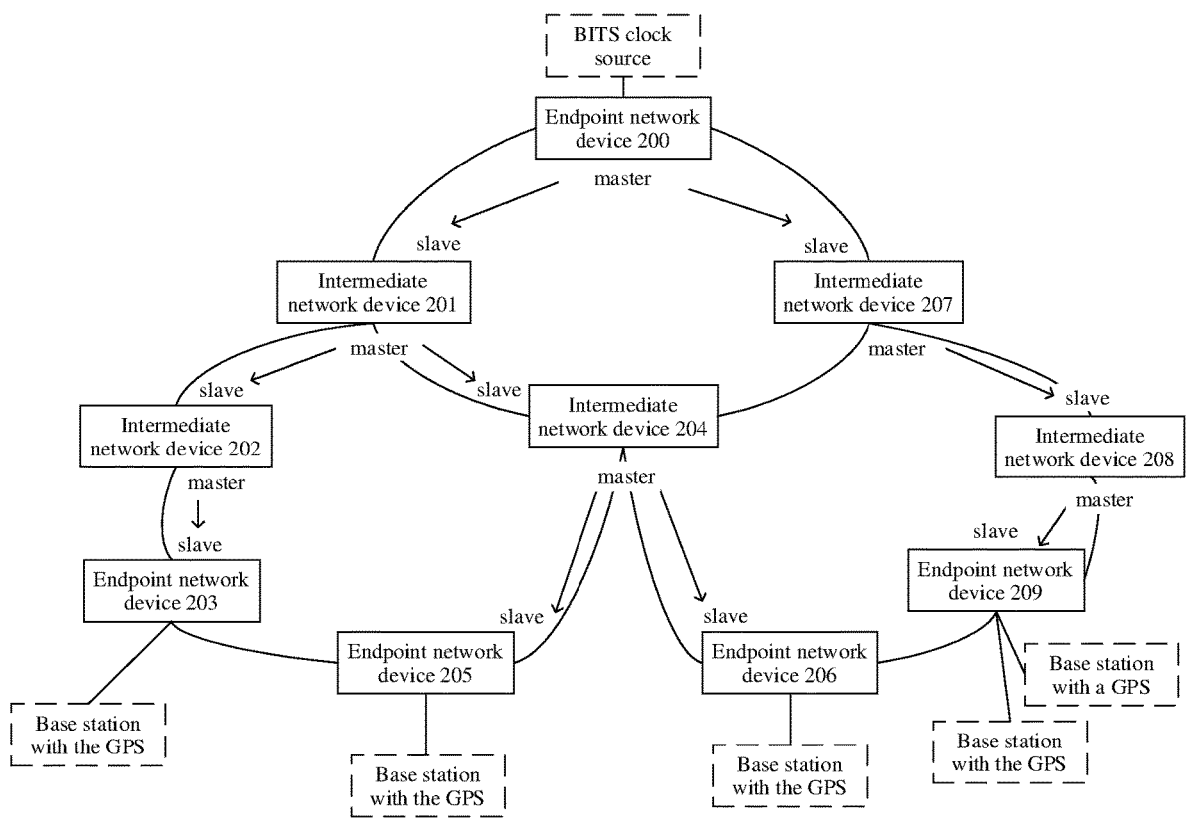
FIG. 3 is a schematic diagram of a structure of another network system according to an embodiment of this application.

For example, refer to a network system shown in FIG. 3, an endpoint network device 200 is an endpoint network device connected to a building integrated timing supply (BITS) clock source. Endpoint network devices 203, 205, 206, and 209 are endpoint network devices connected to base stations with a GPS. The base stations with a GPS are connected to a GPS (a clock source, which is not shown in FIG. 3). It is assumed that the BITS clock source is the target clock source, at least one of the first transmission paths determined by the management device may include First transmission path 1: Endpoint network device 200→Intermediate network device 201→Intermediate network device 202→Endpoint network device 203, First transmission path 2: Endpoint network device 200→Intermediate network device 201→Intermediate network device 204→Endpoint network device 205, first transmission path 3: Endpoint network device 200→Intermediate network device 201→Intermediate network device 204→Endpoint network device 206, and First transmission path 4: Endpoint network device 200→Intermediate network device 207→Intermediate network device 208→Endpoint network device 209.

In S201, the management device may use, based on the connection relationships between the target clock source and the network devices that support clock synchronization and that are in the network system, at least one of a shortest path algorithm (for example, an intelligent clock path finder (ICPF) algorithm), a path loop avoidance algorithm, a port priority algorithm, or an optimal clock hop performance algorithm, to obtain the at least one of the first transmission paths. For example, the management device may first query the connection relationships between the network devices that support clock synchronization and that are in the network system, and a connection relationship between each network device and the target clock source, and then calculate the first transmission path based on a distance between the network device and the target clock source and a specific policy (for example, performing path calculation based on a hop-first policy or a loop first policy). In addition, during calculation of the first transmission path, a loop (loop avoidance for short) needs to be avoided in the determined first transmission path.

Optionally, after determining the first transmission path, the management device may further display the determined first transmission path, so that work personnel of the management device can intuitively understand, based on the first transmission path displayed by the management device, the first transmission path. For example, the management device may display the first transmission path in a graphical manner, or display the first transmission path in a text manner. A manner of displaying the first transmission path by the management device is not limited in this embodiment of this application.

S202: The management device separately sends configuration information for the first transmission path to a plurality of network devices on the first transmission path.

For example, the configuration information sent to the network device on the first transmission path may include information about at least one of a master port (referred to as master) and a slave port (referred to as slave) on the network device. Optionally, when the configuration information of the network device includes information about the master port on the network device, the configuration information of the network device may further include information about a slave port corresponding to the master port of the network device on another network device. When the configuration information of the network device includes information about the slave port of the network device, the configuration information of the network device may further include information about a master port corresponding to the slave port of the network device on another network device. The master port of the network device is a port through which the network device sends a clock packet, and the slave port of the network device is a port through which the network device receives the clock packet. The master port of the network device is configured to send the clock packet to the corresponding slave port, and the slave port of the network device is configured to receive the clock packet from the corresponding master port.

For example, the first transmission path 1 in the network system shown in FIG. 3 is used as an example. Master ports in FIG. 3 are represented as master, and slave ports in FIG. 3 are represented as slave. Configuration information that is for the first transmission path 1 and that is sent by the management device to the endpoint network device 200 includes information about a master port of the endpoint network device 200 and information about a slave port of the intermediate network device 201 corresponding to the master port. Configuration information that is for the first transmission path 1 and that is sent by the management device to the intermediate network device 201 includes information about a master port and the slave port of the intermediate network device 201, information about a slave port of the intermediate network device 202 corresponding to the master port of the intermediate network device 201, and information about the master port of the endpoint network device 200 corresponding to the slave port of the intermediate network device 201. Configuration information that is for the first transmission path 1 and that is sent by the management device to the intermediate network device 202 includes information about a master port and the slave port of the intermediate network device 202, information about a slave port of the endpoint network device 203 corresponding to the master port of the intermediate network device 202, and information about the master port of the intermediate network device 201 corresponding to the slave port of the intermediate network device 202. For configuration information of another first transmission path in the network system shown in FIG. 3, refer to the configuration information of the first transmission path 1. Details are not described in this embodiment of this application again.

The management device determines at least one first transmission path in S201, and the management device may separately send configuration information for the first transmission path to the plurality of network devices on the at least one first transmission path in S202. Optionally, the management device may send the corresponding configuration information to the network devices on the determined first transmission path in ascending order of a quantity of hops from the network devices to the target clock source. In this way, the management device can send, in batches according to such a rule, the configuration information to the plurality of network devices on the at least one first transmission path determined in S201. In addition, when there are a relatively large quantity of the determined first transmission paths in S201, missing sending of the configuration information can be avoided according to the rule of sending the configuration information, and efficiency of sending the configuration information by the management device can be improved.

Figure 4:
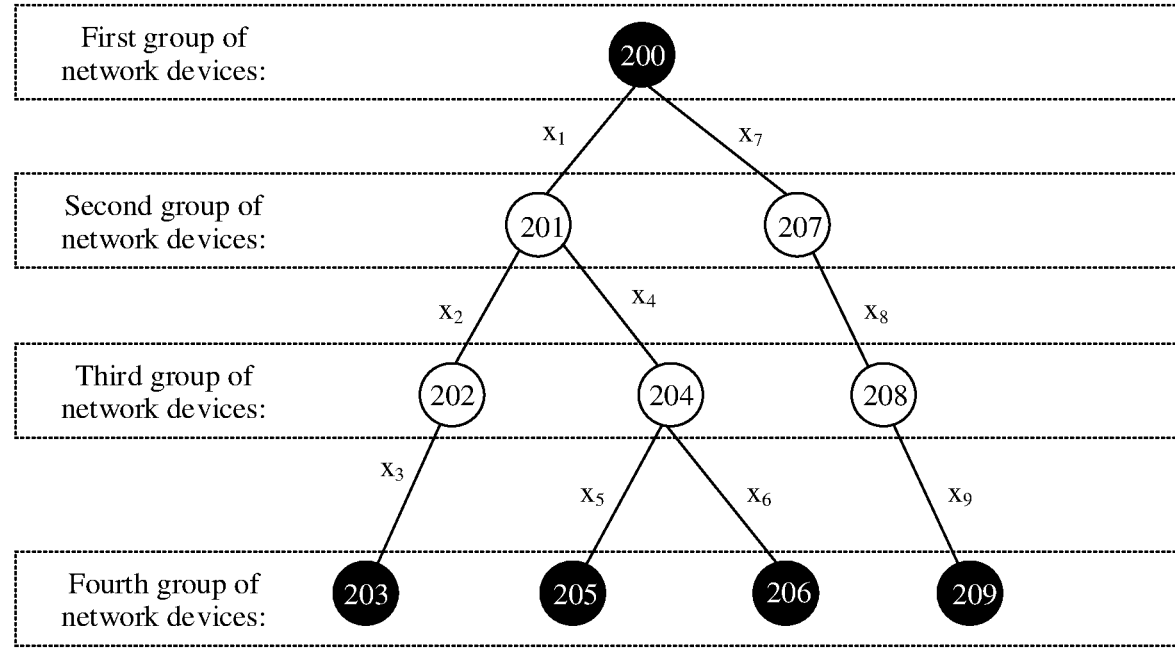
FIG. 4 is a simplified schematic diagram of a network system according to an embodiment of this application.

Four first transmission paths in the network system shown in FIG. 3 are used as examples. It is assumed that the management device sends the corresponding configuration information to the network devices on the four first transmission paths in ascending order of the quantity of hops from the network devices to the target clock source. As shown in FIG. 4, on the four first transmission paths, a first group of network devices that have one hop to the target clock source includes the endpoint network device 200. A second group of network devices that have two hops to the target clock source includes the intermediate network device 201 and the intermediate network device 207. A third group of network devices that have three hops to the target clock source includes the intermediate network device 202, the intermediate network device 204, and the intermediate network device 208. A fourth group of network devices that have four hops to the target clock source include the endpoint network device 203, the endpoint network device 205, the endpoint network device 206, and the endpoint network device 209. In S202, the management device may sequentially send the corresponding configuration information to the first group of network devices, the second group of network devices, the third group of network devices, and the fourth group of network devices.

In this embodiment of this application, an example in which the management device sends the corresponding configuration information to the network devices on the determined first transmission path in ascending order of the quantity of hops from the network devices to the target clock source is used. Optionally, the management device may send the corresponding configuration information to the network devices on the determined first transmission path in another order. For example, the management device may send the corresponding configuration information to the network devices on the determined first transmission path in descending order of the quantity of hops from the network devices to the target clock source. For another example, when determining the plurality of first transmission paths, the management device may sequentially send the corresponding configuration information to the network devices on the plurality of first transmission paths. For still another example, the management device may simultaneously send the corresponding configuration information to the network devices on the determined at least one first transmission path.

S203: The plurality of network devices on the first transmission path configure a parameter of the first transmission path based on the configuration information.

After receiving the configuration information sent by the management device, each network device on the first transmission path may configure the parameter of the first transmission path based on the configuration information. For example, the network device configures the master port of the network device based on the information about the master port of the network device in the received configuration information. The network device configures the slave port of the network device based on the information about the slave port of the network device in the configuration information. The network device configures the slave port corresponding to the master port of the network device based on the information about the slave port corresponding to the master port of the network device in the configuration information. The network device configures the master port corresponding to the slave port of the network device based on the information about the master port corresponding to the slave port of the network device in the configuration information.

S204: The plurality of network devices on the first transmission path process the clock packet of the target clock source based on the parameter of the first transmission path.

After configuring the parameter of the first transmission path, if receiving the clock packet of the target clock source, the network devices on the first transmission path may send the clock packet from the master port of the network device to the corresponding slave port, so that the clock packet is sent, along the first transmission path, to an endpoint network device that is farthest from the target clock source and that is on the first transmission path.

The Four first transmission paths in the network system shown in FIG. 3 are used as examples, the target clock source (BITS clock source) may send the clock packet to the endpoint network device 200. The endpoint network device 200 may send the clock packet from the master port of the endpoint network device 200 to each corresponding slave port (for example, the slave port of the intermediate network device 201 and a slave port of the intermediate network device 207). The intermediate network device 201 may send the clock packet from the master port of the intermediate network device 201 to each corresponding slave port (for example, the slave port of the intermediate network device 202 and a slave port of the intermediate network device 204). The intermediate network device 207 may send the clock packet from a master port of the intermediate network device 207 to each corresponding slave port (for example, a slave port of the intermediate network device 208). The intermediate network device 202 may send the clock packet from the master port of the intermediate network device 202 to each corresponding slave port (for example, the slave port of the endpoint network device 203). The intermediate network device 204 may send the clock packet from a master port of the intermediate network device 204 to each corresponding slave port (for example, a slave port of the endpoint network device 205 and a slave port of the endpoint network device 206). The intermediate network device 208 may send the clock packet from a master port of the intermediate network device 208 to each corresponding slave port (for example, a slave port of the endpoint network device 209).

S205: The endpoint network device on the first transmission path sends, to the management device based on the clock packet, information that is used to determine a time difference.

After receiving the clock packet, the endpoint network device on the first transmission path may send, to the management device for one or more times based on the received clock packet, the information that is used to determine the time difference (TD). For example, the time difference determined based on the information sent by the endpoint network device may be a difference value between 1588 time (for example, 1588V2 time) of the endpoint network device and time of the target clock source. It should be noted that, the TD determined based on the information that is used to determine the TD and that is sent by an endpoint network device (for example, the endpoint network device 200 in FIG. 3) connected to the target clock source in the network system may be a default value (for example, 0 or another default value).

The network device (for example, the endpoint network device or intermediate network device) in the network system reports a clock message to the management device for one or more times. The clock message may carry device information, port information, and the like. Optionally, the endpoint network device may include, in the clock message, the information that is used to determine the time difference, and send the clock message to the management device. Certainly, the endpoint network device may not include, in the clock message, the information that is used to determine the time difference. For example, the endpoint network device directly sends, to the management device, the information that is used to determine the time difference. This is not limited in this embodiment of this application.

S206: The management device sends a corresponding clock compensation value to at least one network device on the first transmission path based on the received information that is used to determine the time difference.

For example, the management device may determine the clock compensation value corresponding to the at least one network device on the first transmission path based on the received information that is used to determine the time difference, and then send the determined clock compensation value to the corresponding network device.

Optionally, the clock compensation value determined by the management device includes at least one of a slave port compensation value and a master port compensation value. When the clock compensation value includes the slave port compensation value, the management device sends the slave port compensation value to the slave port of the network device on the first transmission path. When the clock compensation value includes the master port compensation value, the management device sends the master port compensation value to the master port of the network device on the first transmission path. The master port compensation value and a corresponding slave port compensation value may be the same, and have opposite symbols. The slave port compensation value may be an optical fiber asymmetry compensation value that is used to perform compensation on optical fiber asymmetry.

The first transmission path 1 in the network system shown in FIG. 3 is used as an example. It is assumed that the clock compensation value includes the slave port compensation value, and, in this case, the management device may separately send the slave port compensation value to the intermediate network device 201, the intermediate network device 202, and the endpoint network device 203 in FIG. 3. In addition, it is assumed that the clock compensation value further includes the master port compensation value, and, in this case, the management device may separately send the master port compensation value to the endpoint network device 200, the intermediate network device 201, and the intermediate network device 202 in FIG. 3. The master port compensation value and the corresponding slave port compensation value may be the same, and have opposite symbols. It is assumed that the slave port compensation value sent by the management device to the intermediate network device 201 is 156.2 ns (nanosecond), and, in this case, the master port compensation value sent by the management device to the endpoint network device 200 is −156.2 ns.

The management device may send the clock compensation value to the network device by using a simple network management protocol (SNMP), a network configuration protocol (NETCONF), a command line interface (CLI), or the like. This is not limited in this application.

S207: The at least one network device on the first transmission path performs clock compensation based on the received clock compensation value.

Each network device that receives the clock compensation value and that is on the first transmission path may perform clock compensation based on the received clock compensation value. For example, when the clock compensation value received by the network device includes the slave port compensation value, the network device performs clock compensation corresponding to the slave port. When the clock compensation message received by the network device includes the master port compensation value, the network device performs clock compensation corresponding to the master port.

It should be understood that, in an implementation, after determining the clock compensation value, the management device may not send the clock compensation value to the network device first, but output the clock compensation value to the work personnel of the management device, and then send the clock compensation value to the network device after the clock compensation value is reprocessed by the work personnel. In addition, the management device may not send the clock compensation value to the network device. Instead, the work personnel of the management device deliver the clock compensation value to the network device in a command line manual configuration manner by using the management device.

It should be noted that, in this embodiment of this application, an example in which a parameter of a transmission path that is used to transmit the clock packet of the target clock source is configured is used. Optionally, for a process of configuring a parameter of a transmission path that is used to transmit a clock packet of another clock source, refer to this embodiment of this application. Details are not described herein. For example, the target clock source in this embodiment of this application is a master clock source, the network device in the network system may be further connected to a slave clock source. The management device may simultaneously (or sequentially) configure, by using the parameter configuration method provided in this embodiment of this application, a parameter of a transmission path that is used to transmit clock packets of the master clock source and the slave clock source.

The following describes a process in which the management device determines the clock compensation value corresponding to the at least one network device on the first transmission path based on the received information that is used to determine the time difference in S206.

For example, S206 includes the following.

S2061: The management device determines a relationship between time differences of all first transmission paths and a first group of unknown compensation parameters based on the received information that is used to determine the time difference.

Two ends of the transmission path are endpoint network devices. A time difference of each first transmission path corresponds to the information that is sent by the endpoint network device on the first transmission path and that is used to determine the time difference. The first group of unknown compensation parameters includes a clock compensation value between every two adjacent network devices on the first transmission path.

In this embodiment of this application, if delays on a receiving link and a sending link between the master port and the slave port are asymmetric, a synchronization error is introduced. The error caused by the asymmetric delays may be compensated by setting a compensation value. The to-be-set compensation value is an unknown compensation parameter in this embodiment of this application. The management device abstracts, based on the device information, the port information, clock tracing, time difference information, and the like in the clock message, the information, to determine the relationship between the time differences of all the first transmission paths and the first group of unknown compensation parameters. It should be understood that, when the management device determines the plurality of first transmission paths in S201, the relationship between the time differences of all the first transmission paths and the first group of unknown compensation parameters is a relationship between the time differences of the plurality of first transmission paths and the first group of unknown compensation parameters.

Optionally, when a plurality of pieces of information that are sent by a same endpoint network device, that are used to determine the time difference, and that are received by the management device are different, the management device may preprocess the information. The preprocessing includes performing validity check, discarding an unstable value, or taking an average value of remaining values after removing a maximum value and a minimum value.

Optionally, when the management device receives the plurality of pieces of information that is sent by the same endpoint network device and that is used to determine the time difference, in an example shown in FIG. 3, if the endpoint network device 209 is connected to two base stations with a GPS, the endpoint network device 209 may send, to the management device, the plurality of pieces of information that is used to determine the time difference. In this case, the management device may preprocess the plurality of pieces of information that is used to determine the time difference. The preprocessing includes performing validity check, discarding the unstable value, or taking the average value of the remaining values after removing the maximum value and the minimum value.

For example, with reference to FIG. 3 and FIG. 4, the following describes a process of determining the relationship between the time differences of all the first transmission paths and the first group of unknown compensation parameters.

A quantity of the first transmission paths determined by the management device is equal to a quantity of the endpoint network devices in the network system minus 1. Two ends of the first transmission path are the endpoint network devices, and the first transmission path includes at least one intermediate network device. In an example, the network system shown in FIG. 3 includes five endpoint network devices: the endpoint network device 200, the endpoint network device 203, the endpoint network device 205, the endpoint network device 206, and the endpoint network device 209. Time differences determined based on the information that is sent by the five endpoint network devices and that is used to determine the time differences are respectively a $TD_1$ corresponding to the endpoint network device 200, a $TD_2$ corresponding to the endpoint network device 203, a $TD_3$ corresponding to the endpoint network device 205, a $TD_4$ corresponding to the endpoint network device 206, and a $TD_5$ corresponding to the endpoint network device 209. The four first transmission paths determined by the management device are the first transmission path 1, the first transmission path 2, the first transmission path 3, and the first transmission path 4.

In this scenario, a quantity of parameters in the first group of unknown compensation parameters is the quantity of the network devices on all the first transmission paths minus 1. In the example shown in FIG. 3, there are four first transmission paths in total, and there are 10 network devices on the four first transmission paths. In this case, the quantity of all the unknown compensation parameters that needs to be determined by the management device (that is, the quantity of parameters in the first group of unknown compensation parameters) is nine.

Optionally, the relationship between the time differences of all the first transmission paths and the first group of unknown compensation parameters is as follows: A sum of all unknown compensation parameters on each first transmission path is equal to a difference between time differences determined by using the information that is reported by the endpoint network devices on the first transmission path and that is used to determine the time difference.

In an example shown in FIG. 4, four first groups of unknown compensation parameters corresponding to the four first transmission paths include nine unknown compensation parameters in total, which are respectively $x_1$ to $x_9$. The first transmission path 1 is used as an example, where $x_1$ is a clock compensation parameter between the intermediate network device 201 and the endpoint network device 200, $x_2$ is a clock compensation parameter between the intermediate network device 202 and the intermediate network device 201, and $x_3$ is a clock compensation parameter between the endpoint network device 203 and the intermediate network device 202.

A sum of the three unknown compensation parameters on the first transmission path 1 is a difference (that is, the time difference of the first transmission path 1) between the time differences determined by using the information that is reported by the endpoint network device 200 and the endpoint network device 203 on the first transmission path 1 and that is used to determine the time differences:

$$x_1+x_2+x_3=TD_2-TD_1.$$

Likewise, the following may be obtained:

$$x_1+x_4+x_5=TD_3-TD_1;$$

$$x_1+x_4+x_6=TD_4-TD_1; \text{ and}$$

$$x_7+x_8+x_9=TD_5-TD_1.$$

S2062: The management device determines, based on the relationship between the time differences of all the first transmission paths and the first group of unknown compensation parameters, the clock compensation value.

Optionally, the management device determines, based on the relationship between the time differences of all the first transmission paths and the first group of unknown compensation parameters, a value of the first group of unknown compensation parameters, and then uses the value of the first group of unknown compensation parameters as the clock compensation value.

For example, the management device may determine the value of the first group of unknown compensation parameters by using the following method: The management device obtains a coefficient matrix based on the time difference of the first transmission path and the first group of unknown compensation parameters. The management device determines the value of the first group of unknown compensation parameters based on the coefficient matrix and the time difference of the first transmission path. The coefficient matrix is represented as: $A=(a_{ij})_{M\times N}$, where A is the coefficient matrix, $a_{ij}$ is an element in the coefficient matrix and represents whether a $j^{th}$ unknown compensation parameter exists on an $i^{th}$ first transmission path, N is a quantity of the unknown compensation parameters, N is a quantity of the network devices minus 1, M is a quantity of the first transmission paths, and M is a quantity of the endpoint network devices on all the first transmission paths minus 1. If the $j^{th}$ unknown compensation parameter exists on an $i^{th}$ first transmission path, $a_{ij}=1$. If the $j^{th}$ unknown compensation parameter does not exist on the $i^{th}$ first clock link, $a_{ij}=0$, where $1\leq i\leq M$, and $1\leq j\leq N$.

In the example shown in FIG. 4, the coefficient matrix is:

$$A = \begin{bmatrix} 1 & 1 & 1 & 0 & 0 & 0 & 0 & 0 & 0 \\ 1 & 0 & 0 & 1 & 1 & 0 & 0 & 0 & 0 \\ 1 & 0 & 0 & 1 & 0 & 1 & 0 & 0 & 0 \\ 0 & 0 & 0 & 0 & 0 & 0 & 1 & 1 & 1 \end{bmatrix}.$$

Optionally, after determining the coefficient matrix according to the foregoing method, the management device may determine the value of the first group of unknown compensation parameters by using the following formula with reference to the time difference of the first transmission path:

$$b = (TD_2 - TD_1, \ldots, TD_i - TD_1), \text{ and } (x_i, \ldots, x_j) = x_{LSN} = A^+ b,$$

where $2 \leq i \leq M$, $1 \leq j \leq N$, $(x_1, \ldots, x_j)$ is the first group of unknown compensation parameters (which may be represented as $x_{LSN}$), $x_j$ is a $j^{th}$ unknown compensation parameter in the first group of unknown compensation parameters, $TD_i - TD_1$ is a time difference of an $(i-1)^{th}$ first transmission path, b is a vector formed by the time differences of all the first transmission paths, M is a quantity of the first transmission paths, N is the quantity of the unknown compensation parameters, A is the coefficient matrix, and $A^+$ is a Moore-Penrose generalized inverse matrix of the coefficient matrix A.

In the example shown in FIG. 4, the vector $b = (TD_2 - TD_1, \ldots, TD_5 - TD_1)$. The first group of unknown compensation parameters is represented as $x = (x_1, \ldots, x_9)$.

Optionally, the management device determines, based on the relationship of the time differences of all the first transmission paths and the first group of unknown compensation parameters, that algorithms of the clock compensation value include a full rank decomposition algorithm, a singular value decomposition algorithm, a Lagrange multiplier algorithm, an artificial intelligence algorithm, and the like. The artificial intelligence algorithm includes a neural network system algorithm, an ant colony optimization algorithm, and the like. This is not limited in this application.

In the example shown in FIG. 4, it is assumed that:
$TD_1 = 100$ ns, $TD_2 = 365$ ns, $TD_3 = 380$ ns, $TD_4 = 451$ ns, and $TD_5 = 620$ ns;
$b = (256, 280, 351, 520)$; and
$x_{LSN} = (156.2, 49.9, 49.9, 106.2, 17.6, 88.6, 173.3, 173.3, 173.3)$.

In this case, $x_1 = 156.2$ ns, $x_2 = 49.9$ ns, $x_3 = 49.9$ ns, ..., and $x_9 = 173.3$ ns.

In this embodiment of this application, to objectively compare a calculated clock compensation value and provide a clock compensation value with higher precision and higher accuracy, an entire network evaluation indicator is further defined, and a probability of correct calculation of an unknown compensation parameter that is calculated for one or more times is determined by using the entire network evaluation indicator. In this embodiment of this application, a smaller entire network evaluation indicator value indicates a higher probability of correct calculation.

Optionally, the management device determines, based on the relationship between the time differences of all the first transmission paths and the first group of unknown compensation parameters, an average value of the probability of correct calculation of the value of the first group of unknown compensation parameters. For example, when determining that the average value is greater than or equal to a target indicator, the management device uses a calculated value of the first group of unknown compensation parameters as the clock compensation value, where the target indicator is a preset value of the probability of correct calculation.

Optionally, after obtaining the coefficient matrix A based on all the first transmission paths and the first group of unknown compensation parameters, the management device determines, the average value of the probability of correct calculation of the value of the first group of unknown compensation parameters according to:

$P_{mean} = r/N$, where $r = \text{rank}(A)$, $1 \leq i \leq M$, $1 \leq j \leq N$, where $P_{mean}$ is the average value of the probability of correct calculation of the value of the first group of unknown compensation parameters, N is the quantity of the unknown compensation parameters in the first group of unknown compensation parameters, and r is a rank of the coefficient matrix A.

In the example shown in FIG. 4, with reference to the calculated coefficient matrix, $r = \text{rank}(A) = 4$, and $P_{mean} = 0.444$ may be obtained through calculation. Therefore, the average value of the probability of correct calculation of the value of the first group of unknown compensation parameters is 44.4%.

Optionally, the target indicator may be a target probability of correct calculation required by the work personnel of the management device, or may be a target probability of correct calculation that is automatically set by the management device based on experience. This is not limited in this embodiment of this application.

In an example, when $P_{mean} = 0.444$, if the target indicator is 40%, the management device determines the calculated value of the first group of unknown compensation parameters as the clock compensation value. If the target indicator is 60%, the management device continues to perform calculation until obtaining, through calculation, a value of an $N^{th}$ group of unknown compensation parameters whose probability of correct calculation is greater than or equal to the target indicator, and determines the value of the $N^{th}$ group of unknown compensation parameters as the clock compensation value. For a method in which the management device continues to perform calculation, refer to the following method for obtaining a value of a second group of unknown compensation parameters. Details are not described herein.

Optionally, to improve accuracy of calculating the clock compensation value, the management device may calculate a plurality of groups of the unknown compensation parameters and an entire network evaluation indicator corresponding to each group of unknown compensation parameters, and select a group of unknown compensation parameters corresponding to a better entire network evaluation indicator as the clock compensation value. For example, the management device may determine the value of the first group of unknown compensation parameters and a first entire network evaluation indicator based on the relationship between the time differences of all the first transmission paths and the first group of unknown compensation parameters. The first entire network evaluation indicator is an evaluation value of the value of the first group of unknown compensation parameters. The management device determines a relationship between time differences of all second transmission paths and the second group of unknown compensation parameters by changing a role of the network device. The management device determines a value of the second group of unknown compensation parameters and a second entire network evaluation indicator based on the relationship between the time differences of all the second transmission paths and the second group of unknown compensation parameters. The second entire network evaluation indicator is an evaluation value of the value of the second group of unknown compensation parameters. The management device determines that the second entire network evaluation indicator is better than the first entire network evaluation indicator. The management device determines the value of the second group of unknown compensation parameters as the clock compensation value based on determining that the second entire network evaluation indicator is better than the first entire network evaluation indicator. The evaluation value indicates whether a calculation result of a value of an unknown compensation parameter is good or not. In this embodiment, a smaller calculation result indicates a better calculation result. It should be understood that the management device is not limited to calculating only two groups of unknown compensation parameters and two corresponding entire network evaluation indicators, and may calculate three, four, or even more groups of unknown compensation parameters and corresponding entire network evaluation indicators.

Optionally, after obtaining the coefficient matrix A, the management device determines the first entire network evaluation indicator by using the following formula:

$$AEIN = \frac{N^2}{r} + std(p);$$

$$r = \text{rank}(A);$$

$$E = (e_{ij})_{N \times M} = I - A^+ A;$$

$$p_j = 1 - \sum_{j=1}^{N} e_{ij}^2, (i = 1, \ldots, N); \text{ and}$$

$$p = (p_1, \ldots, p_f, \ldots, p_k), (p_f \neq 1, 1 \leq f \leq k),$$

$1 \leq i \leq M$, and $1 \leq j \leq N$; AEIN is the first entire network evaluation indicator, N is the quantity of the unknown compensation parameters in the first group of unknown compensation parameters, N is a quantity of network devices on all the first transmission paths minus 1, r is the rank of the coefficient matrix A, I is a unit matrix, $A^+$ is the Moore-Penrose generalized inverse matrix of the coefficient matrix A, E is an error matrix of the values of the first group of unknown compensation parameters, $e_{ij}$ is an element of the error matrix, and $p_f$ is a probability of correct calculation of a value of an $f^{th}$ unknown compensation parameter, P is a subset vector formed by remaining k elements after an element whose probability is 1 is removed in $P_f$ (f=1, . . . , n), and std(p) is a standard deviation of a vector p.

In the example shown in FIG. 4, with reference to the calculated coefficient matrix, the following may be obtained through calculation:

$$A^+ = \begin{bmatrix} 0.2308 & 0.1538 & 0.1538 & 0 \\ 0.3846 & -0.0769 & -0.0769 & 0 \\ 0.3846 & -0.0769 & -0.0769 & 0 \\ -0.1538 & 0.2308 & 0.2308 & 0 \\ -0.0769 & 0.6154 & -0.3846 & 0 \\ -0.0769 & -0.3846 & 0.6154 & 0 \\ 0 & 0 & 0 & 0.3333 \\ 0 & 0 & 0 & 0.3333 \\ 0 & 0 & 0 & 0.3333 \end{bmatrix};$$

p=(0.5385, 0.3846, 0.3846, 0.4615, 0.6154, 0.6154, 0.3333, 0.3333, 0.3333); and

AEIN=20.3614.

The first entire network evaluation indicator is 20.3614, in other words, the evaluation value of the value of the first group of unknown compensation parameters is 20.3614.

The management device may determine the relationship between the time differences of all the second transmission paths and the second group of unknown compensation parameters by changing the role of the network device.

Manner 1: The management device changes some intermediate network devices in the plurality of network devices into endpoint network devices.

In Manner 1, after changing the intermediate network devices into the endpoint network devices, the management device may send instructions to the network devices that are changed into the endpoint network devices, so that the intermediate network devices that are changed into the endpoint network devices send, to the management device, information (referred to as new information for ease of description) that is used to determine the time difference. The management device receives the new information sent by the intermediate network devices that are changed into the endpoint network devices, and the management device determines, the relationship between the time differences of all the second transmission paths and the second group of unknown compensation parameters (including a plurality of unknown compensation parameters) based on the new information.

In Manner 1, in another implementation, after changing the intermediate network devices into the endpoint network devices, the management device simulates and calculates the new information about the intermediate network devices that are changed into the endpoint network device. The management device determines the relationship between the time differences of all the second transmission paths and the second group of unknown compensation parameters based on the new information.

Figure 5:
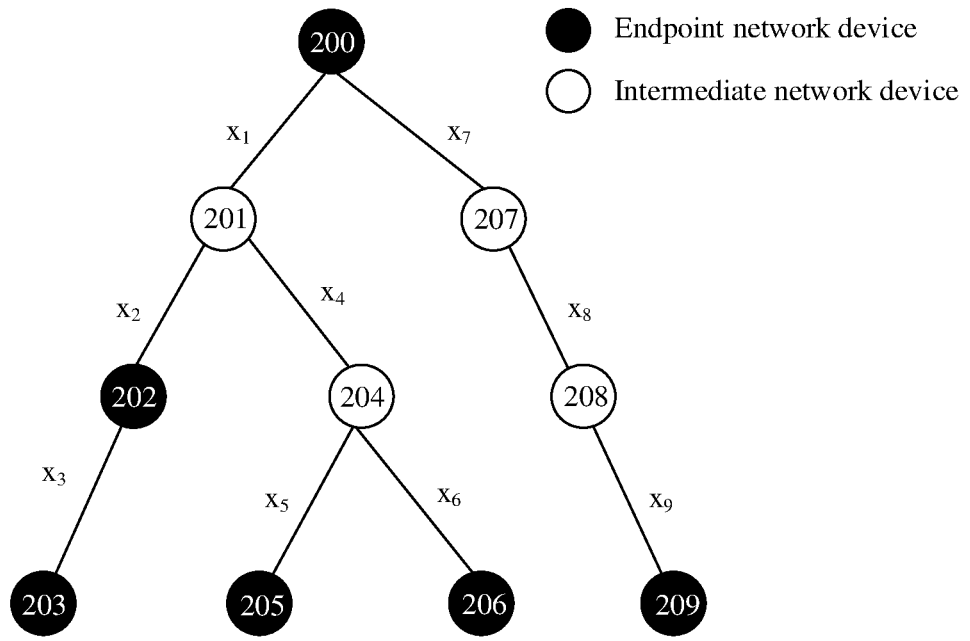
FIG. 5 is a simplified schematic diagram of another network system according to an embodiment of this application.

In an example, the management device changes the intermediate network device 202 into an endpoint network device in a manner of changing the role of the network device in FIG. 4. To be specific, the management device changes the original intermediate network device 202 into the endpoint network device. The management device receives the new information sent by the network device 202. The new information is used to determine that the time difference is a $TD_6$. Alternatively, the management device simulates and calculates, for the network device 202, a piece of information that is used to determine a time difference $TD_6$. In this way, the management device obtains a relationship between time differences of all the second transmission paths and the second group of unknown compensation parameters shown in FIG. 5. In FIG. 5, endpoint network devices are separately the endpoint network device 200, the intermediate network device 202, the endpoint network device 203, the endpoint network device 205, the endpoint network device 206, and the endpoint network device 209. There are 6 endpoint network devices. The management device adds one transmission path to the original four first transmission paths, to obtain five second transmission paths, which are separately as follows. Second transmission path i: Endpoint network device 200→Intermediate network device 201→Intermediate network device 202→Endpoint network device 203, Second transmission path 2: Endpoint network device 200→Intermediate network device 201→Intermediate network device 204→Endpoint network device 205, Second transmission path 3: Endpoint network device 200→Intermediate network device 201→Intermediate network device 204→Endpoint network device 206, Second transmission path 4: Endpoint network device 200→Intermediate network device 207→Intermediate network device 208→Endpoint network device 209, and Second transmission path 5 (the newly added transmission path): Endpoint network device 200→Intermediate network device 201→Endpoint network device 202.

In this way, the relationship between the time differences of all the second transmission paths and the second group of unknown compensation parameters is expressed as:

$$\begin{cases} x_1 + x_2 + x_3 = TD_2 - TD_1 \\ x_1 + x_4 + x_5 = TD_3 - TD_1 \\ x_1 + x_4 + x_6 = TD_4 - TD_1 \\ x_7 + x_8 + x_9 = TD_5 - TD_1 \\ x_1 + x_2 = TD_6 - TD_1 \end{cases}$$

Manner 2: The management device changes some intermediate network devices into omitted network devices. A network device other than the omitted network devices on the at least one first transmission path is referred to as a second network device. The management device determines the relationship between the time differences of all the second transmission paths and the second group of unknown compensation parameters based on the second network device.

Figure 6:
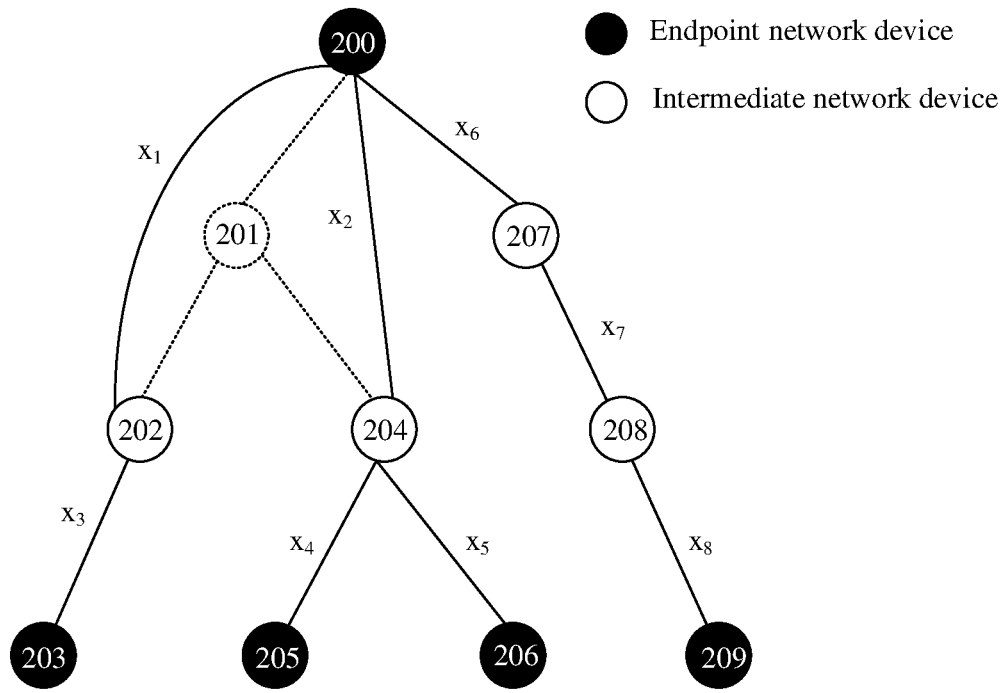
FIG. 6 is a simplified schematic diagram of another network system according to an embodiment of this application.

In an example, the management device changes the intermediate network device 201 in FIG. 4 into an omitted network device in a manner of changing the role of the network device. To be specific, the management device does not include the network device 201 in calculation, to obtain a second network device 200, a second network device 202, a second network device 203, a second network device 204, a second network device 205, a second network device 206, a second network device 207, a second network device 208, and a second network device 209 in FIG. 6. In this way, a relationship between time differences of all the second transmission paths and the second group of unknown compensation parameters shown in FIG. 6 is obtained. In FIG. 6, endpoint network devices are separately the endpoint network device 200, the endpoint network device 203, the endpoint network device 205, the endpoint network device 206, and the endpoint network device 209. There are five endpoint network devices, and there are four second transmission paths in total. Second transmission path i: Endpoint network device 200→Intermediate network device 202→Endpoint network device 203, Second transmission path 2: Endpoint network device 200→Intermediate network device 204→Endpoint network device 205, Second transmission path 3: Endpoint network device 200→Intermediate network device 204→Endpoint network device 206, and Second transmission path 4: Endpoint network device 200→Intermediate network device 207→Intermediate network device 208→Endpoint network device 209.

The relationship between the time differences of all the second transmission paths and the second group of unknown compensation parameters is expressed as:

$$\begin{cases} x_1 + x_3 = TD_2 - TD_1 \\ x_2 + x_4 = TD_3 - TD_1 \\ x_2 + x_5 = TD_4 - TD_1 \\ x_7 + x_8 + x_6 = TD_5 - TD_1 \end{cases}$$

Optionally, the management device obtains a second coefficient matrix based on the relationship between the time differences of all the second transmission paths and the second group of unknown compensation parameters. In this embodiment of this application, a method for obtaining the second coefficient matrix is consistent with the method for obtaining the coefficient matrix A. For detailed descriptions, refer to the method for obtaining the coefficient matrix A. Details are not described herein again.

In an example shown in FIG. 5, a quantity N of the second group of unknown compensation parameters is 9, a quantity M of the transmission paths is 5, and the second coefficient matrix is as follows:

$$A = \begin{bmatrix} 1 & 1 & 1 & 0 & 0 & 0 & 0 & 0 & 0 \\ 1 & 0 & 0 & 1 & 1 & 0 & 0 & 0 & 0 \\ 1 & 0 & 0 & 1 & 0 & 1 & 0 & 0 & 0 \\ 0 & 0 & 0 & 0 & 0 & 0 & 1 & 1 & 1 \\ 1 & 1 & 0 & 0 & 0 & 0 & 0 & 0 & 0 \end{bmatrix}.$$

In an example shown in FIG. 6, a quantity N of the second group of unknown compensation parameters is 8, a quantity M of the transmission paths is 4, and the second coefficient matrix is as follows:

$$A = \begin{bmatrix} 1 & 0 & 1 & 0 & 0 & 0 & 0 & 0 \\ 0 & 1 & 0 & 1 & 0 & 0 & 0 & 0 \\ 0 & 1 & 0 & 0 & 1 & 0 & 0 & 0 \\ 0 & 0 & 0 & 0 & 0 & 1 & 1 & 1 \end{bmatrix}.$$

After obtaining the second coefficient matrix, the management device may determine the value of the second group of unknown compensation parameters based on the second coefficient matrix and the time differences of all the second transmission paths.

In this embodiment of this application, a calculation method for determining the value of the second group of unknown compensation parameters is consistent with the calculation method for determining the value of the first group of unknown compensation parameters. For detailed descriptions, refer to the calculation method for the value of the first group of unknown compensation parameters. Details are not described herein again.

In this embodiment of this application, a method for determining an average value of a probability of correct calculation of the value of the second group of unknown compensation parameters is consistent with the method for determining the average value of the probability of correct calculation of the value of the first group of unknown compensation parameters. A method for calculating the second entire network evaluation indicator is consistent with the method for calculating the first entire network evaluation indicator. For detailed descriptions, refer to the foregoing method for calculating the average value of the probability of correct calculation of the value of the first group of unknown compensation parameter and the foregoing method for calculating the first entire network evaluation indicator. Details are not described herein again.

Optionally, the management device determines, based on whether the average value of the probability of correct calculation of the value of the second group of unknown compensation parameters is greater than or equal to a target indicator, whether to stop calculation.

In an example, if the required target indicator is 80%, when calculating the second entire network evaluation indicator and the value of the second group of unknown compensation parameters, the management device determines, by using the following formula, whether to further simulate and add one or more endpoint network devices, where a quantity of the added endpoint network devices is greater than or equal to 1.

$$p_{mean} \geq p_{req}.$$

In the example shown in FIG. 5, if the average value of the probability of correct calculation $P_{mean}$ of the value of the second group of unknown compensation parameters is equal to 0.5556≈55.6%, which is less than the target indicator 80%, the management device continues to simulate and add the endpoint network device, until the average value of the probability of correct calculation of the value of the second group of unknown compensation parameters is greater than or equal to the target indicator 80%, or all the intermediate network devices are changed into the newly added endpoint network devices already.

Optionally, the management device outputs, to a user interface of the management device, information about the intermediate network device that is changed to the endpoint network device.

In the foregoing example in FIG. 4, to be specific, the slave port compensation value of each network device is a value of the element in the first group of unknown compensation parameters. For example: A clock compensation value of the slave port of the network device 201 is 156.2 ns, and a slave port compensation value of the network device 202 is 49.9 ns. Similarly, a slave port compensation value of another network device may be obtained. Optionally, the slave port compensation value is determined based on the value of the second group of unknown compensation parameters.

In the example shown in FIG. 5, the second group of unknown compensation parameters $(x_1, \ldots, x_9)$=(1562, 499,499,1062,17.6,886,1733,1733,1733) determined by the management device may be obtained in combination with calculation, and the management device determines that the slave port compensation value of each network device is as follows: A slave port compensation value of the network device 201 is 156.2 ns, and a slave port compensation value of the network device 202 is 49.9 ns. Similarly, a slave port compensation value of another network device may be obtained.

Optionally, the management device may further output the clock compensation value, the first entire network evaluation indicator, or the second entire network evaluation indicator to a user management interface of the management device.

In a possible scenario, lengths of a receive optical fiber and a transmit optical fiber between the network devices are not equal. A transmission delay of a 1-meter optical fiber is 5 nanoseconds (ns). In this case, a time synchronization error of 2.5 ns is introduced due to 1-meter asymmetry, and a time synchronization error of 1 microsecond (microsecond, μs) is introduced due to 400-meters asymmetry. In an actual network system, it is difficult to accurately control end-to-end fiber asymmetry of an entire network within 400 m. For a synchronization requirement of +/−1.5 μs in a time division-synchronous code division multiple access (Time Division-Synchronous Code Division Multiple Access, TD-SCDMA) network system and a long term evolution-time division duplex (Long Term Evolution-time Division Duplex, LTE-TDD) network system, it is clear that the synchronization error of 1 μs is intolerable. Generally, asymmetric value detection and compensation need to be manually performed. However, a bearer network system is huge and scattered, and is deployed across countries, regions, provinces, and cities. As a result, manual operations are complex and time-consuming, and a relatively high professional knowledge requirement is imposed on an operator. In this embodiment of this application, the management device can obtain the information that is sent by the endpoint network device and that is used to determine the time difference, and automatically calculate a network-wide clock compensation value based on the information, to reduce a quantity of onsite measurement of maintenance personnel, and lower skill requirements for management and operation personnel.

Optionally, the network device not only has the master port and the slave port, but also may have a passive (passive) port. The management device may hand over the passive port of the network device to the slave port, perform clock compensation by using the foregoing compensation method, and then hand over the port to the passive port.

The foregoing describes the parameter configuration method provided in embodiments of this application. The following describes a parameter configuration device provided in embodiments of this application.

Figure 7:
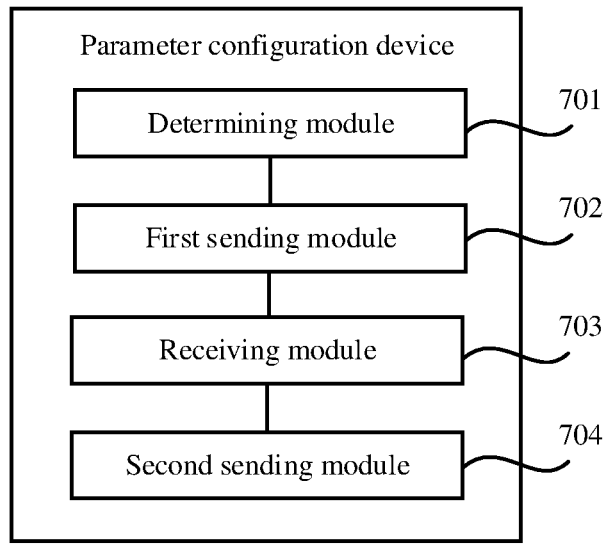
FIG. 7 is a schematic diagram of a structure of a parameter configuration device according to an embodiment of this application.

FIG. 7 is a schematic diagram of a structure of a parameter configuration device according to an embodiment of this application. The parameter configuration device may be applied to a management device in a network system. As shown in FIG. 7, the parameter configuration device may include: a determining module 701, configured to determine a first transmission path that is in a network system and that is used to transmit a clock packet of a target clock source, a first sending module 702, configured to separately send configuration information for the first transmission path to a plurality of network devices on the first transmission path, a receiving module 703, configured to receive information that is sent by an endpoint network device on the first transmission path and that is used to determine a time difference, and a second sending module 704, configured to send a corresponding clock compensation value to at least one network device on the first transmission path based on the received information that is used to determine the time difference.

The determining module 701 may be configured to perform an operation in S201 in the parameter configuration method shown in FIG. 2. The first sending module 702 may be configured to perform an operation in S202 in the parameter configuration method shown in FIG. 2. The receiving module 703 may be configured to perform an operation related to the management device in S205 in the parameter configuration method shown in FIG. 2. The second sending module 704 may be configured to perform an operation in S206 in the parameter configuration method shown in FIG. 2.

Optionally, the determining module 701 is configured to determine a plurality of first transmission paths that are in the network system and that are used to transmit the clock packet of the target clock source.

Optionally, the first sending module 702 is configured to send the corresponding configuration information to the network devices on the determined first transmission path in ascending or descending order of a quantity of hops from the network devices to the target clock source.

Optionally, the determining module 701 is configured to: obtain a clock parameter of each network device in the network system, where the clock parameter of the network device is used to indicate whether the network device supports clock synchronization, determine, based on the clock parameter of the network device in the network system, a network device that supports clock synchronization in the network system, and determine the first transmission path based on a connection relationship between the network device that supports clock synchronization and the target clock source.

Optionally, the second sending module 704 is configured to: determine a relationship between time differences of all first transmission paths and a first group of unknown compensation parameters based on the received information that is used to determine the time difference, where the time difference of the first transmission path corresponds to the information that is sent by the endpoint network device on the first transmission path and that is used to determine the time difference, and the first group of unknown compensation parameters includes a clock compensation value between every two adjacent network devices on the first transmission path, determine, based on the relationship between the time differences of all the first transmission paths and the first group of unknown compensation parameters, the clock compensation value corresponding to the at least one network device, and send the corresponding clock compensation value to the at least one network device.

Optionally, the time difference is a difference value between 1588 time of the endpoint network device and time of the target clock source.

Optionally, the clock compensation value includes an optical fiber asymmetry compensation value.

Figure 8:
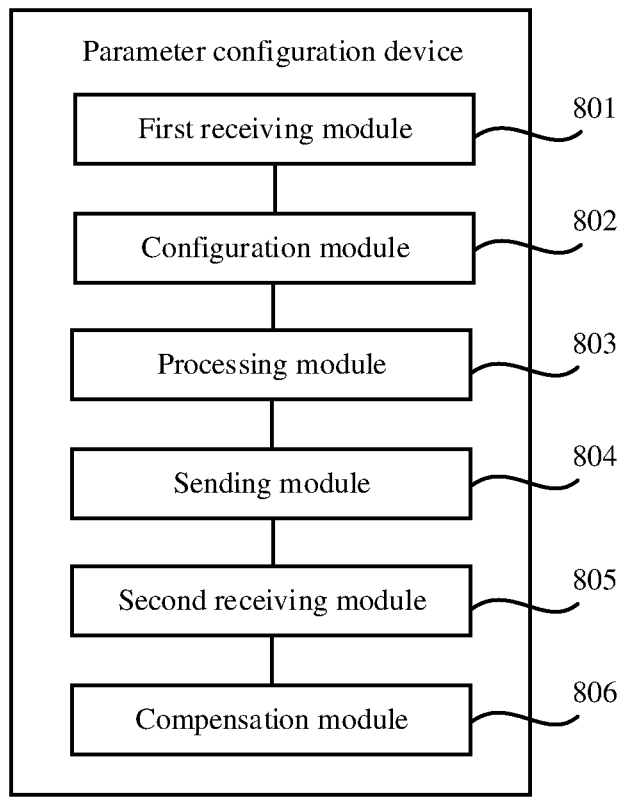
FIG. 8 is a schematic diagram of a structure of another parameter configuration device according to an embodiment of this application.

FIG. 8 is a schematic diagram of a structure of another parameter configuration device according to an embodiment of this application. The parameter configuration device may be applied to an endpoint network device in a network system. As shown in FIG. 8, the parameter configuration device may include a first receiving module 801, configured to receive configuration information sent by a management device a configuration module 802, configured to configure, based on the configuration information, a parameter of a first transmission path that is used to transmit a clock packet of a target clock source a processing module 803, configured to process the clock packet based on the parameter of the first transmission path, a sending module 804, configured to send, to the management device based on the clock packet, information that is used to determine a time difference, a second receiving module 805, configured to receive a clock compensation value sent by the management device, and a compensation module 806, configured to perform clock compensation based on the clock compensation value.

The first receiving module 801 may be configured to perform an operation related to the endpoint network device in S202 in the parameter configuration method shown in FIG. 2. The configuration module 802 may be configured to perform an operation related to the endpoint network device in S203 in the parameter configuration method shown in FIG. 2. The processing module 803 may be configured to perform an operation related to the endpoint network device in S204 in the parameter configuration method shown in FIG. 2. The sending module 804 may be configured to perform an operation in S205 in the parameter configuration method shown in FIG. 2. The second receiving module 805 may be configured to perform an operation related to the endpoint network device in S206 in the parameter configuration method shown in FIG. 2. The compensation module 806 may be configured to perform an operation related to the endpoint network device in S207 in the parameter configuration method shown in FIG. 2.

Figure 9:
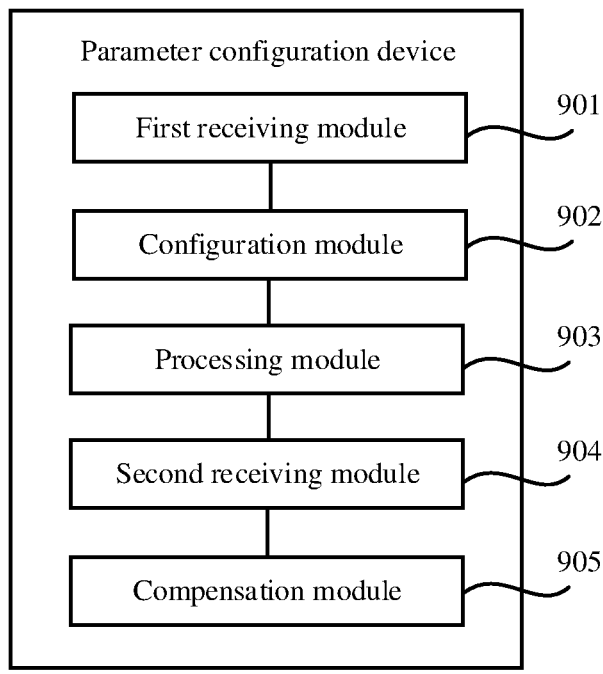
FIG. 9 is a schematic diagram of a structure of another parameter configuration device according to an embodiment of this application.

FIG. 9 is a schematic diagram of a structure of another parameter configuration device according to an embodiment of this application. The parameter configuration device may be applied to an intermediate network device in a network system. As shown in FIG. 9, the parameter configuration device may include a first receiving module 901, configured to receive configuration information sent by a management device, a configuration module 902, configured to configure, based on the configuration information, a parameter of a first transmission path that is used to transmit a clock packet of a target clock source, a processing module 903, configured to process the clock packet based on the parameter of the first transmission path, a second receiving module 904, configured to receive a clock compensation value sent by the management device, and a compensation module 905, configured to perform clock compensation based on the clock compensation value.

The first receiving module 901 may be configured to perform an operation related to the intermediate network device in S202 in the parameter configuration method shown in FIG. 2. The configuration module 902 may be configured to perform an operation related to the intermediate network device in S203 in the parameter configuration method shown in FIG. 2. The processing module 903 may be configured to perform an operation related to the intermediate network device in S204 in the parameter configuration method shown in FIG. 2. The second receiving module 904 may be configured to perform an operation related to the intermediate network device in S206 in the parameter configuration method shown in FIG. 2. The compensation module 905 may be configured to perform an operation related to the intermediate network device in S207 in the parameter configuration method shown in FIG. 2.

The foregoing describes the management device and the network device in embodiments of this application. The following describes possible product forms of the management device and the network device. It should be understood that any form of product that has a feature of the management device in FIG. 7 and any form of product that has a feature of the network device in FIG. 8 or FIG. 9 fall within the protection scope of this application. It should be further understood that the following descriptions are only examples, and do not limit the product forms of the management device and the network device in embodiments of this application.

In a possible product form, the management device or the network device provided in embodiments of this application may be implemented by using a general bus architecture.

Figure 10:
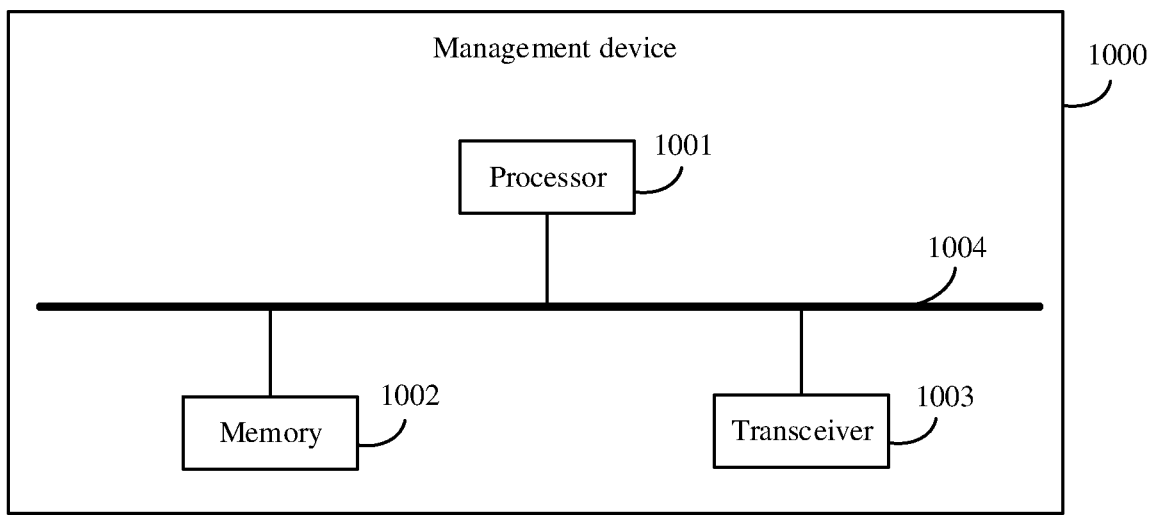
FIG. 10 is a schematic diagram of a structure of a management device according to an embodiment of this application.

As shown in FIG. 10, an embodiment of this application provides a management device. The management device 1000 includes a processor 1001, a memory 1002, and a transceiver 1003. The memory 1002 stores at least one instruction. The processor 1001 is configured to load the instruction, to perform the foregoing parameter configuration method, and control the transceiver 1003 to perform the foregoing parameter configuration method. The processor 1001, the memory 1002, and the transceiver 1003 may be connected to each other by using a bus 1004.

The processor 1001 may be a general-purpose central processing unit (CPU), an application-specific integrated circuit (ASIC), or one or more integrated circuits configured to control program execution of the solutions in this application.

The memory 1002 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto.

Figure 11:
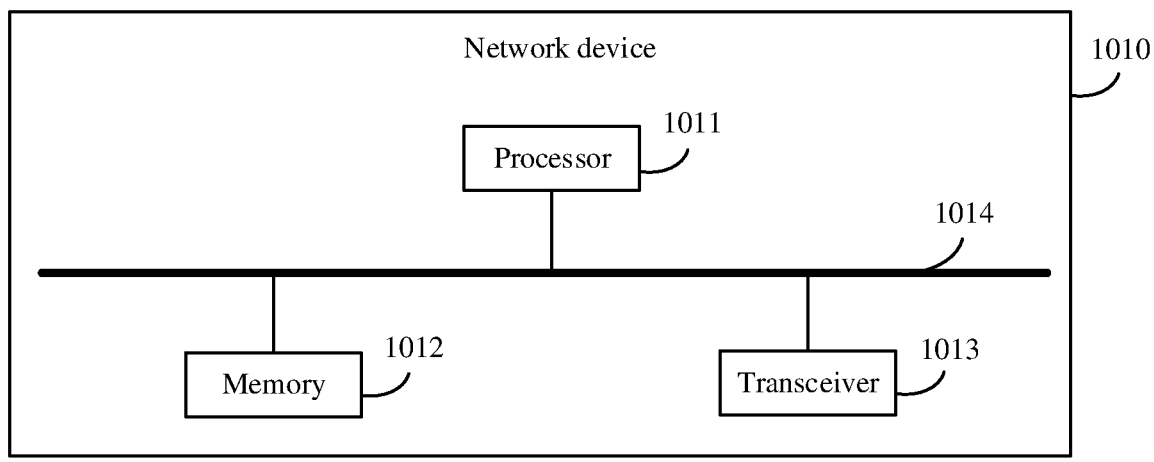
FIG. 11 is a schematic diagram of a structure of a network device according to an embodiment of this application.

As shown in FIG. 11, an embodiment of this application provides a network device 1010. The network device 1010 includes a processor 1011, a memory 1012, and a transceiver 1013. The memory 1012 stores at least one instruction. The processor 1011 is configured to load the instruction, and control the transceiver 1013 to perform the foregoing parameter configuration method. The processor 1011, the memory 1012, and the transceiver 1013 may be connected to each other by using a bus 1014. A product form of the processor 1011 is similar to the product form of the processor 1001, and a product form of the memory 1012 is similar to the product form of the memory 1002. Details are not described herein again.

Figure 12:
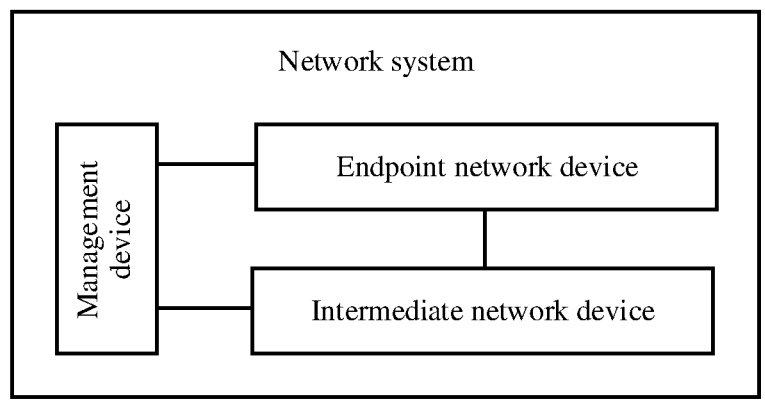
FIG. 12 is a schematic diagram of a structure of another network system according to an embodiment of this application.

An embodiment of this application provides a network system. The network system includes a management device and a plurality of network devices. For example, as shown in FIG. 12, the network system includes a management device, an endpoint network device, and an intermediate network device. The management device is the parameter configuration device shown in FIG. 7. The endpoint network device is the parameter configuration device shown in FIG. 8. The intermediate network device is the parameter configuration device shown in FIG. 9. Alternatively, the management device is shown in FIG. 10, and both the intermediate network device and the endpoint network device are shown in FIG. 11.

An embodiment of this application provides a computer-readable storage medium. The storage medium stores a computer program. The computer program is used to perform the method performed by the management device in any parameter configuration method provided in embodiments of this application.

An embodiment of this application provides another computer-readable storage medium. The storage medium stores a computer program. The computer program is used to perform the method performed by the endpoint network device in any parameter configuration method provided in embodiments of this application.

An embodiment of this application provides another computer-readable storage medium. The storage medium stores a computer program. The computer program is used to perform the method performed by the intermediate network device in any parameter configuration method provided in embodiments of this application.

An embodiment of this application provides a computer program product including instructions. When the computer program product is run on a network device, the network device is enabled to perform the method performed by the management device in any parameter configuration method provided in embodiments of this application.

An embodiment of this application provides a computer program product including instructions. When the computer program product is run on a network device, the network device is enabled to perform the method performed by the endpoint network device in any parameter configuration method provided in embodiments of this application.

An embodiment of this application provides a computer program product including instructions. When the computer program product is run on a network device, the network device is enabled to perform the method performed by the intermediate network device in any parameter configuration method provided in embodiments of this application.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a computer network, or another programmable device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this application, the terms "first", "second", and the like are only intended for descriptions, and shall not be understood as indications or implications of relative importance. The term "at least one" means one or more, and the term "a plurality of" means two or more, unless expressly limited otherwise.

Different types of embodiments such as the method embodiment and the device embodiments provided in embodiments of this application may be mutually referred to. This is not limited in embodiments of this application. A sequence of the operations of the method embodiment provided in embodiments of this application can be properly adjusted, and the operations can be correspondingly added or deleted based on a situation. Any method that can be easily figured out by a person skilled in the art without departing from a technical scope disclosed in this application shall fall within the protection scope of this application, and therefore details are not described again.

In the corresponding embodiments provided in this application, it should be understood that the disclosed system, device, and the like may be implemented in other manners. For example, the described device embodiments are only examples. For example, division into the units is only logical function division and may be other division in actual implementation. For example, a plurality of units or components may be combined or integrated into another system, or some features may be ignored or not performed. In addition, the displayed or discussed mutual couplings, direct couplings, or communication connections may be implemented by using some interfaces. The indirect couplings or communication connections between the devices or units may be implemented in electronic or other forms.

The units described as separate parts may or may not be physically separate, and parts described as units may or may not be physical units, may be located in one position, or may be distributed on a plurality of network devices (for example, terminal devices). Some or all of the units may be selected based on actual requirements to achieve the objectives of the solutions of embodiments.

The foregoing descriptions are only specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by a management device, a first transmission path, wherein the first transmission path is in a network system, wherein the management device is outside the first transmission path, and wherein the first transmission path is used to transmit a clock packet of a target clock source;
   sending, by the management device, configuration information for the first transmission path to a plurality of network devices on the first transmission path, wherein the configuration information comprises transmission path configuration data that configures network device parameters for establishing the first transmission path;
   receiving, by the management device, information sent by an endpoint network device on the first transmission path, the information used to determine a time difference; and
   sending, by the management device, a corresponding clock compensation value to at least one network device on the first transmission path based on the information.

2. The method according to claim 1, wherein the determining the first transmission path comprises:
   determining, by the management device, a plurality of first transmission paths that are in the network system and that are used to transmit the clock packet of the target clock source.

3. The method according to claim 1 wherein the sending the configuration information comprises:
   sending, by the management device, corresponding configuration information to the plurality of network devices in an ascending or descending order of a quantity of hops from the plurality of network devices to the target clock source.

4. The method according to claim 1, wherein the determining the first transmission path comprises:
   obtaining, by the management device, a corresponding clock parameter of each network device in the network system, wherein the corresponding clock parameter of an i-th network device indicates whether the i-th network device supports clock synchronization;
   determining, by the management device based on the corresponding clock parameter of the each network device in the network system, a network device supporting the clock synchronization in the network system; and
   determining, by the management device, the first transmission path based on a connection relationship between the network device and the target clock source.

5. The method according to claim 1, wherein the sending the corresponding clock compensation value comprises:
   determining, by the management device, a relationship between time differences of all first transmission paths and a first group of unknown compensation parameters based on the information used to determine the time difference, wherein the time difference of the first transmission path corresponds to the information sent by the endpoint network device, and wherein the first group of unknown compensation parameters comprises a clock compensation value between every two adjacent network devices on the first transmission path;
   determining, by the management device based on the relationship between the time differences of all the first transmission paths and the first group of unknown compensation parameters, the corresponding clock compensation value corresponding to the at least one network device; and
   sending, by the management device, the corresponding clock compensation value to the at least one network device.

6. The method according to claim 1, wherein the time difference is a difference value between a 1588 time of the endpoint network device and a time of the target clock source.

7. The method according to claim 1, wherein the corresponding clock compensation value comprises an optical fiber asymmetry compensation value.

8. An apparatus, wherein the apparatus comprises:
   at least one processor;
   at least one non-transitory computer-readable storage medium storing a program to be executed by the at least one processor, the program including instructions to cause the apparatus to perform:
   determining a first transmission path, wherein the first transmission path is in a network system, wherein the apparatus is outside the first transmission path, and wherein the first transmission path is used to transmit a clock packet of a target clock source;
   sending configuration information for the first transmission path to a plurality of network devices on the first transmission path, wherein the configuration information comprises transmission path configuration data that configures network device parameters for establishing the first transmission path;
   receiving information sent by an endpoint network device on the first transmission path, the information used to determine a time difference; and
   sending a corresponding clock compensation value to at least one network device on the first transmission path based on the information.

9. The apparatus according to claim 8, wherein the determining the first transmission path comprises:
   determining a plurality of first transmission paths that are in the network system and that are used to transmit the clock packet of the target clock source.

10. The apparatus according to claim 8, wherein the sending the configuration information comprises:
    sending corresponding configuration information to the network devices in an ascending or descending order of a quantity of hops from the plurality of network devices to the target clock source.

11. The apparatus according to claim 8, wherein the determining the first transmission path comprises:
    obtaining a corresponding clock parameter of each network device in the network system, wherein the corresponding clock parameter of an i-th network device indicates whether the i-th network device supports clock synchronization;
    determining, based on the corresponding clock parameter of each network device in the network system, a network device supporting the clock synchronization in the network system; and determining the first transmission path based on a connection relationship between the network device and the target clock source.

12. The apparatus according to claim 8, wherein the sending the corresponding clock compensation value comprises:
   determining a relationship between time differences of all first transmission paths and a first group of unknown compensation parameters based on the information used to determine the time difference, wherein the time difference of the first transmission path corresponds to the information sent by the endpoint network device, and wherein the first group of unknown compensation parameters comprises a clock compensation value between every two adjacent network devices on the first transmission path;
   determining, based on the relationship between the time differences of all the first transmission paths and the first group of unknown compensation parameters, the corresponding clock compensation value corresponding to the at least one network device; and
   sending the corresponding clock compensation value to the at least one network device.

13. The apparatus according to claim 8, wherein the time difference is a difference value between a 1588 time of the endpoint network device and a time of the target clock source.

14. The apparatus according to claim 8, wherein the corresponding clock compensation value comprises an optical fiber asymmetry compensation value.

15. A non-transitory storage medium storing a program, which when executed by a management device, causes the management device to perform operations, the operations comprising:
   determining a first transmission path, wherein the first transmission path is in a network system, wherein the management device is outside the first transmission path, and wherein the first transmission path is used to transmit a clock packet of a target clock source;
   sending configuration information for the first transmission path to a plurality of network devices on the first transmission path, wherein the configuration information comprises transmission path configuration data that configures network device parameters for establishing the first transmission path;
   receiving information sent by an endpoint network device on the first transmission path, the information used to determine a time difference; and
   sending a corresponding clock compensation value to at least one network device on the first transmission path based on the information.

16. The non-transitory storage medium according to claim 15, wherein the determining the first transmission path comprises:
   determining a plurality of first transmission paths that are in the network system and that are used to transmit the clock packet of the target clock source.

17. The non-transitory storage medium according to claim 15, wherein the sending the configuration information comprises:
   sending corresponding configuration information to the plurality of network devices in an ascending or descending order of a quantity of hops from the plurality of network devices to the target clock source.

18. The non-transitory storage medium according to claim 15, wherein the determining the first transmission path comprises:
   obtaining a corresponding clock parameter of each network device in the network system, wherein the corresponding clock parameter of an i-th network device indicates whether the i-th network device supports clock synchronization;
   determining, based on the corresponding clock parameter of each network device in the network system, a network device supporting the clock synchronization in the network system; and
   determining, by the management device, the first transmission path based on a connection relationship between the network device and the target clock source.

19. The non-transitory storage medium according to claim 15, wherein the sending the corresponding clock compensation value comprises:
   determining a relationship between time differences of all first transmission paths and a first group of unknown compensation parameters based on the information used to determine the time difference, wherein the time difference of the first transmission path corresponds to the information sent by the endpoint network device, and wherein the first group of unknown compensation parameters comprises a clock compensation value between every two adjacent network devices on the first transmission path;
   determining, based on the relationship between the time differences of all the first transmission paths and the first group of unknown compensation parameters, the corresponding clock compensation value corresponding to the at least one network device; and
   sending, by the management device, the corresponding clock compensation value to the at least one network device.

20. The non-transitory storage medium according to claim 15, wherein the time difference is a difference value between a 1588 time of the endpoint network device and a time of the target clock source.

* * * * *